United States Patent
He et al.

(10) Patent No.: US 10,995,900 B2
(45) Date of Patent: May 4, 2021

(54) VERTICAL FLOOR SELF-LOCKING MUSICAL INSTRUMENT STAND AND SELF-LOCKING HOOK

(71) Applicants: Sen He, Pingxiang (CN); Xu Liang, Guangdong (CN)

(72) Inventors: Sen He, Pingxiang (CN); Xu Liang, Guangdong (CN)

(*) Notice: Subject to any disclaimer, the term of this patent is extended or adjusted under 35 U.S.C. 154(b) by 0 days.

(21) Appl. No.: 16/908,866

(22) Filed: Jun. 23, 2020

(65) Prior Publication Data
US 2021/0080049 A1    Mar. 18, 2021

(30) Foreign Application Priority Data
Sep. 18, 2019  (CN) .......................... 201921555437.6

(51) Int. Cl.
| G10G 5/00 | (2006.01) |
| F16M 11/28 | (2006.01) |
| F16M 11/24 | (2006.01) |

(52) U.S. Cl.
CPC ........... F16M 11/28 (2013.01); F16M 11/242 (2013.01); G10G 5/00 (2013.01)

(58) Field of Classification Search
None
See application file for complete search history.

(56) References Cited

U.S. PATENT DOCUMENTS

| 5,202,527 | A | * | 4/1993 | Gracie | F16M 11/28 |
| | | | | | 84/327 |
| 6,622,981 | B1 | * | 9/2003 | Hsieh | F16M 11/28 |
| | | | | | 248/291.1 |
| 7,007,909 | B2 | * | 3/2006 | Hsieh | F16B 7/1463 |
| | | | | | 248/412 |
| 7,176,366 | B1 | * | 2/2007 | Bruce | A47B 81/00 |
| | | | | | 84/327 |
| 8,020,817 | B2 | * | 9/2011 | Yu | G10G 5/00 |
| | | | | | 248/125.8 |
| 8,028,963 | B2 | * | 10/2011 | Speggiorin | F16M 11/28 |
| | | | | | 248/177.1 |
| 8,490,942 | B1 | * | 7/2013 | Henry | G10G 5/00 |
| | | | | | 248/441.1 |
| 9,208,761 | B2 | * | 12/2015 | Miyajima | F16M 11/2021 |
| 9,564,111 | B2 | * | 2/2017 | Hankins | G10G 5/00 |
| 9,704,461 | B2 | * | 7/2017 | Hennessey | G10G 5/00 |
| 9,863,573 | B2 | * | 1/2018 | May | F16B 7/10 |

(Continued)

Primary Examiner — Robert W Horn
(74) Attorney, Agent, or Firm — W&K IP

(57) ABSTRACT

The present invention relates to a vertical floor self-locking musical instrument stand and a self-locking hook. The vertical floor self-locking musical instrument stand is provided with a plurality of folding structures, which can facilitate telescopic storage and reduce the occupied space. The telescopic length can be changed as needed to be portable. Various components are flexibly connected and assembled. The height of the position can be adjusted as needed. The stand is equipped with a folding anti-collision component and a self-locking hook, which can better protect the musical instrument and prevent the musical instrument from bumping or falling. When the musical instrument is suspended on the self-locking hook, the self-locking hook automatically locks the self-locking locking arm under the gravity of the musical instrument itself, providing protection for the musical instrument suspended thereon.

20 Claims, 11 Drawing Sheets

(56) References Cited

U.S. PATENT DOCUMENTS

| | | | |
|---|---|---|---|
| 2007/0131089 A1* | 6/2007 | Hsieh | F16M 11/28 |
| | | | 84/422.3 |
| 2007/0145202 A1* | 6/2007 | Hsieh | G10G 5/00 |
| | | | 248/161 |
| 2008/0135697 A1* | 6/2008 | Workman | G10G 5/00 |
| | | | 248/177.1 |
| 2008/0265116 A1* | 10/2008 | Chen | G10G 5/00 |
| | | | 248/291.1 |
| 2009/0301285 A1* | 12/2009 | Vildosola Erdociain | |
| | | | G10G 5/00 |
| | | | 84/385 A |
| 2020/0234680 A1* | 7/2020 | Reeder | F16M 11/20 |

* cited by examiner

VERTICAL FLOOR SELF-LOCKING MUSICAL INSTRUMENT STAND AND SELF-LOCKING HOOK

TECHNICAL FIELD

The present invention relates to the technical field of musical instrument stands, in particular to a vertical floor self-locking musical instrument stand and a self-locking hook.

BACKGROUND

The currently used guitars and other stringed instruments of similar structure need to be temporarily placed on shelf for storage or be stored for display when not being played. If placed incorrectly or touched by an external force, stringed instruments such as guitars fall easily due to slippage or even are damaged due to fall. In order to provide protection for musical instruments when they are placed on shelf, a musical instrument hook or a musical instrument stand for fixedly positioning, temporarily storing, and displaying stringed instruments such as guitars is designed.

One type of musical instrument stands is a vertical floor musical instrument stand: a bearing structure of the fixed musical instrument is provided on the stand, a single supporting fork for protecting the musical instrument is provided at the bottom of the stand. A piano guard supporting fork is provided at the top of the stand. A simple interceptor is used to prevent the musical instrument from falling and sliding, which is rigid and inconvenient to operate. The stand needs to be disassembled into several main parts when the stand is stored. The assembly is also rigid and inflexible. It is inconvenient to carry about. A vertical floor instrument stand can generally only hold one musical instrument.

SUMMARY

In view of this, it is necessary to provide a vertical floor self-locking musical instrument stand, which is convenient to store, and a self-locking hook.

In order to solve the above technical problems, the technical solution adopted by the present invention is as follows: a vertical floor self-locking musical instrument stand, comprising: a telescopic rod, comprising an inner rod and an outer rod nested and connected, and a fastener which fastens the telescopic positions of the inner rod and the outer rod; a folding supporting frame, which is connected to the tail end of the telescopic rod and is unfolded or folded in an umbrella-like manner; a folding anti-collision component, which is connected to the telescopic rod and is unfolded or folded in an articulated manner, in which a flexible member is provided at an end away from the telescopic rod for anti-collision; a self-locking hook, which is connected to the telescopic rod, comprising a hook housing, a driving lever, a rotation shaft, a movable arm and an elastic device, wherein the hook housing forms a bayonet, the hook housing is provided with a cavity, the driving lever comprises a driving frame and a connecting rod, one end of the connecting rod is connected to the telescopic rod away from one end of the driving frame, the driving frame extends into the cavity, the driving frame comprises a driving rod driving the rotation shaft and two tail wings extending away from the driving rod, the connecting rod is nested between the two tail wings and is hinged with the tail wings via a bolt, convex strips are provided at both sides of the connecting rod, the elastic device is configured in the cavity, one end of the elastic device is abutted against one end of the driving frame away from the connecting rod, and the other end of the elastic device is abutted against the inner wall surface of the hook housing, when the hook housing bears load, one end of the tail wing away from the driving rod pushes the convex strip, the driving lever rotates to compress the elastic device, the driving lever drives the rotation shaft to rotate so that the movable arm rotates and is blocks the opening of the bayonet, when the elastic device restores, the elastic device pushes the driving lever, and the driving lever, the rotation shaft and the movable arm swing back, so that the self-locking hook is unfolded.

Further, the folding supporting frame comprises a supporting leg, a connecting frame, a supporting strip and a collar, the folding supporting leg comprises at least three supporting legs hinged with the connecting frame, a sleeve hole adapted to the telescopic rod is provided in the middle of the connecting frame, the collar is sleeved at the bottom end of the telescopic rod, one end of the supporting strip is hinged with the middle section of the supporting leg, and the other end thereof is hinged with the collar.

Further, the folding anti-collision component comprises a connecting sleeve, a supporting rod and an anti-collision rod, the connecting sleeve is sleeved on the telescopic rod, the connecting sleeve extends radially outward to form a chuck, the chuck comprises an arc-shaped sliding surface, an first positioning bayonet, which is provided at an upper end of the arc-shaped sliding surface and supports the supporting rod, and a second positioning bayonet, which is provided at a lower end of the arc-shaped sliding surface and close to the telescopic rod with a downward-facing opening, the supporting rod is hinged with the connecting sleeve, a tension spring is provided between the supporting rod and the connecting sleeve, and the anti-collision rod is connected with the end of the supporting rod away from the connecting sleeve.

Further, the hook housing is U-shaped, comprising two arms and a bottom connecting the two arms, wherein a rotation shaft is provided in each of the arms, each of the rotation shafts is connected with the movable arm which is placed outside the arm of the hook housing, and the driving rod drives the two rotation shafts simultaneously so that the two movable locking arms block the opening of the bayonet.

Further, a supporting platform supporting the elastic device is provided between the two tail wings at an end away from the connecting rod, and a limiting boss adapted to the elastic device is provided on the inner wall surface of the hook housing.

Further, the tail wing is provided with a first waist-shaped hole and a first through hole in a direction away from the driving rod in sequence, the connecting rod is provided with a second waist-shaped hole and a second through hole, the connecting rod is connected with the second through hole and the first waist-shaped hole by a first bolt, and the connecting rod is connected with the second waist-shaped hole and the first through hole by a second bolt.

Further, the vertical floor self-locking musical instrument stand further comprises a connecting base, wherein the connecting base is sleeved on the telescopic rod and extends radially outward to form a locking block, the locking block comprises an arc-shaped sliding base, an first positioning slot, which is provided at an upper end of the arc-shaped sliding base and supports the connecting rod, and a second positioning slot, which is provided at a lower end of the arc-shaped sliding base and close to the telescopic rod with a downward-facing opening, and an anti-loosening spring is provided between the connecting base and the connecting rod.

Further, one end of the tail wing away from the driving rod is provided with a bump abutted against the convex strip.

Further, the fastener comprises a threaded sleeve sleeved and fixed on an end of the outer rod and an elastic rotating sleeve sleeved on the inner rod and fastened to the threaded sleeve by screw threads.

Further, a simple hook nested with the telescopic rod is provided at the top of the telescopic rod, the simple hook comprises a column sleeve and a hook body, the column sleeve is nested with the telescopic rod, and the hook body extends to be exposed.

The beneficial effect of the present invention is that when the musical instrument is suspended thereon, the self-locking hook automatically locks the self-locking locking arm under the gravity of the musical instrument itself, providing protection for the musical instrument suspended thereon. The folding anti-collision component can prevent the musical instrument from collision and provide buffering. The telescopic rod can facilitate telescopic storage, and the telescopic length can be changed as needed; a plurality of folding structures are provided, which can be conveniently unfolded or folded, facilitate storage and reduce the occupied space, or the folding structures can be disassembled as needed. It is convenient and flexible to store and convenient to carry about.

The present invention further provides a self-locking hook, comprising a hook housing, a driving lever, a rotation shaft, a movable arm and an elastic device, wherein the hook housing forms a bayonet, the hook housing is provided with a cavity, one end of the driving lever extends into the cavity and the other end thereof is used for fixed connecting, the driving lever comprises a driving frame and a connecting rod, the driving frame comprises a driving rod driving the rotation shaft and two tail wings extending away from the driving rod, the connecting rod is nested between the two tail wings and is hinged with the tail wings via a bolt, convex strips are provided at both sides of the connecting rod, the elastic device is configured in the cavity, one end of the elastic device is abutted against one end of the driving frame away from the connecting rod, and the other end of the elastic device is abutted against the inner wall surface of the hook housing, when the hook housing bears load, one end of the tail wing away from the driving rod pushes the convex strip, the driving lever rotates to compress the elastic device, the driving lever drives the rotation shaft to rotate so that the movable arm rotates and is blocks the opening of the bayonet, when the elastic device restores, the elastic device pushes the driving lever, and the driving lever, the rotation shaft and the movable arm swing back, so that the self-locking hook is unfolded.

Further, a supporting platform supporting the elastic device is provided between the two tail wings at an end away from the connecting rod, and a limiting boss adapted to the elastic device is provided on the inner wall surface of the hook housing.

Further, one of the tail wing and the connecting rod is adapted to the bolt, and there is a movable gap between the other of the tail wing and the connecting rod and the bolt.

Further, the tail wing is provided with a first waist-shaped hole and a first through hole in a direction away from the driving rod in sequence, the connecting rod is provided with a second waist-shaped hole and a second through hole, a first bolt connects the second through hole and the first waist-shaped hole, a second bolt connects the second waist-shaped hole and the first through hole, there is a movable gap between the first waist-shaped hole and the first bolt, the first through hole is adapted to the second bolt, there is a movable gap between the second waist-shaped hole and the second bolt, and the second through hole is adapted to the first bolt.

Further, the tail wing is provided with a supporting groove and a first through hole in a direction away from the driving rod in sequence, the supporting groove is opened at the end of the elastic device abutted against the hook housing, the connecting rod is provided with a second waist-shaped hole and a second through hole, the first bolt connects the supporting groove and the second through hole, the second bolt connects the first through hole and the second waist-shaped hole, there is a movable gap between the supporting groove and the first bolt, the first through hole is adapted to the second bolt, there is a movable gap between the second waist-shaped hole and the second bolt, and the second through hole is adapted to the first bolt.

Further, one end of the tail wing away from the driving rod is provided with a bump abutted against the convex strip.

Further, two tail wings are provided in parallel, one end of the two tail wings away from the driving rod is provided with a connecting column connecting the two tail wings, and the connecting rod is provided with a movable groove adapted to the connecting column.

Further, one end of the rotation shaft movably connected to the driving lever is an open slot with a radial opening, and both ends of the driving rod are abutted against the open slot of the two rotation shafts, respectively; and when the driving lever drives the movable rotating shaft to rotate, the driving rod moves up and down in the open slot to drive the movable rotating shaft to rotate, thereby driving the movable arm to switch between the open state and the closed state.

Further, the hook housing is U-shaped, comprising two arms and a bottom connecting the two arms, wherein a rotation shaft is provided in each of the arms, each of the rotation shafts is connected with the movable arm which is placed outside the arm of the hook housing, and the driving rod drives the two rotation shafts simultaneously so that the two movable locking arms block the opening of the bayonet.

Further, the self-locking hook further comprises a connecting base, wherein the connecting base extends radially outward to form a locking block, the locking block comprises an arc-shaped sliding base, an first positioning slot, which is provided at an upper end of the arc-shaped sliding base and supports the connecting rod, and a second positioning slot, which is provided at a lower end of the arc-shaped sliding base with a downward-facing opening, and an anti-loosening spring is provided between the connecting base and the connecting rod.

The beneficial effect of the present invention is that unlike the prior art musical instrument hooks which need to manually lock the musical instrument to the hook, the present invention uses a driving lever, a rotation shaft and an elastic device to drive the movable arm to rotate. When the self-locking hook weighs, the elastic device is compressed under the action of gravity, and at the same time, drives the hook housing to move downward. The driving lever drives the rotation shaft to rotate, which in turn drives the movable arm to rotate and be blocks the opening of the bayonet. When the elastic device restores, the driving lever restores under the action of the restoring force. The rotation shaft swings back to drive the movable arm to swing back, and the opening of the bayonet is opened; the self-locking hook of the present invention does not require manual opening and closing of the locking arm, which solves the inconvenience of manually opening and closing the locking arm in the prior art, so that it is more convenient to pick and place stringed instruments.

DESCRIPTION OF THE EMBODIMENTS

Figure 1:
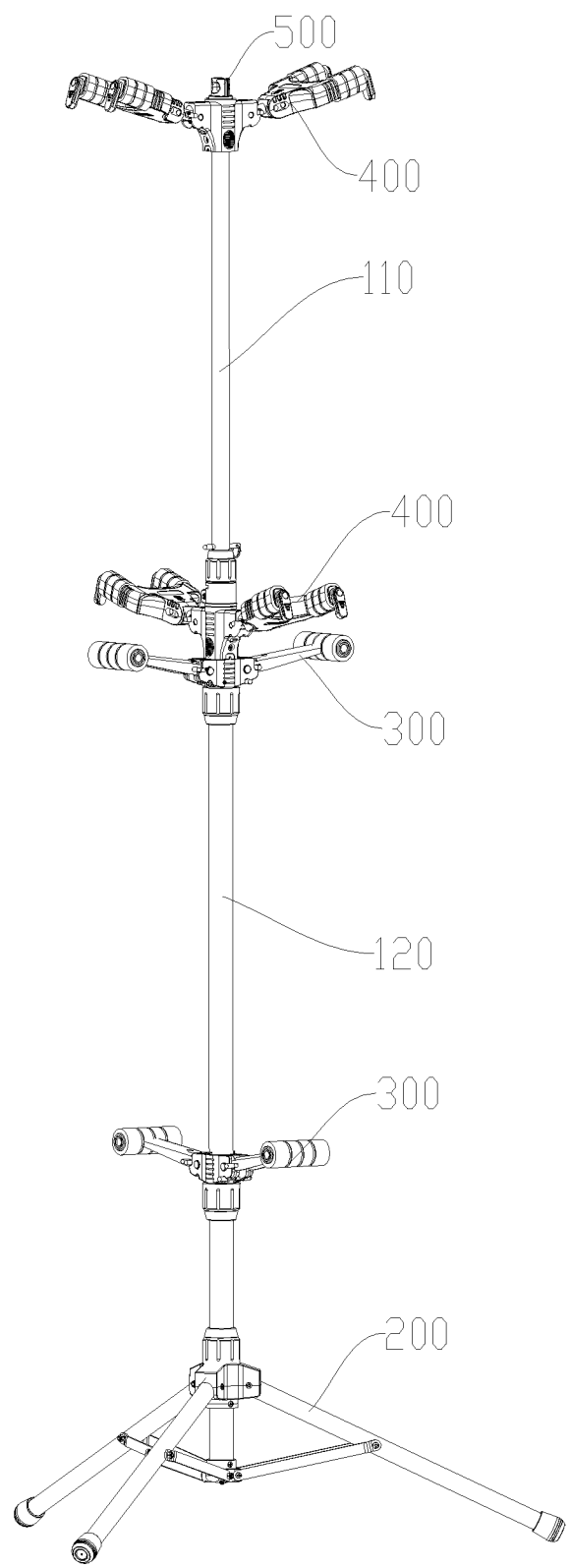
FIG. 1 is a schematic structural diagram of a vertical floor self-locking musical instrument stand according to an embodiment of the present invention.

In order to make the object, technical solution and advantage of the present invention more clear, a vertical floor self-locking musical instrument stand of the present invention will be described in further detail below with reference to the drawings and embodiments. It should be understood that the specific embodiments described herein are only for the purpose of explaining the present invention and are not intended to limit the present invention.

Referring to FIG. 1 to FIG. 16, a vertical floor self-locking musical instrument stand comprises: a telescopic rod 100, comprising an inner rod 110 and an outer rod 120 nested and connected, and a fastener 130 which fastens the telescopic positions of the inner rod 110 and an outer rod 120; a folding supporting frame 200, which is connected to the tail end of the telescopic rod 100 and is unfolded or folded in an umbrella-like manner; a folding anti-collision component 300, which is connected to the telescopic rod 100 and is unfolded or folded in an articulated manner, in which a flexible member is provided at an end away from the telescopic rod 100 for anti-collision; a self-locking hook 400, which is connected to the telescopic rod 100, comprising a hook housing 410, a driving lever, a rotation shaft 440, a movable arm 450 and an elastic device 460, wherein the hook housing 410 forms a bayonet 411, the hook housing 410 is provided with a cavity, the driving lever comprises a driving frame 420 and a connecting rod 430, one end of the connecting rod 430 is connected to the telescopic rod 100 away from one end of the driving frame 420, the driving frame 420 extends into the cavity, the driving frame 420 comprises a driving rod 422 driving the rotation shaft 440 and two tail wings 421 extending away from the driving rod 422, the connecting rod 430 is nested between the two tail wings 421 and is hinged with the tail wings 421 via a bolt, convex strips 431 are provided at both sides of the connecting rod 430, the elastic device 460 is configured in the cavity, one end of the elastic device is abutted against one end of the driving frame 420 away from the connecting rod 430, and the other end of the elastic device is abutted against the inner wall surface of the hook housing 410, when the hook housing 410 bears load, one end of the tail wing 421 away from the driving rod 422 is abutted against the convex strip 431, the driving lever rotates to compress the elastic device 460, the driving lever drives the rotation shaft 440 to rotate so that the movable arm 450 rotates and is blocks the opening of the bayonet 411, when the elastic device 460 restores, the elastic device 460 pushes the driving lever, and the driving lever, the rotation shaft 440 and the movable arm 450 swing back, so that the self-locking hook 400 is unfolded.

When the musical instrument is suspended thereon, the self-locking hook 400 automatically locks the self-locking locking arm under the gravity of the musical instrument itself, providing protection for the musical instrument suspended thereon. The folding anti-collision component 300 can prevent the musical instrument from collision and provide buffering. The telescopic rod 100 can facilitate telescopic storage, and the telescopic length can be changed as needed; a plurality of folding structures are provided, which can be conveniently unfolded or folded, facilitate storage and reduce the occupied space, or the folding structures can be disassembled as needed. It is convenient and flexible to store and convenient to carry about.

Figure 6:
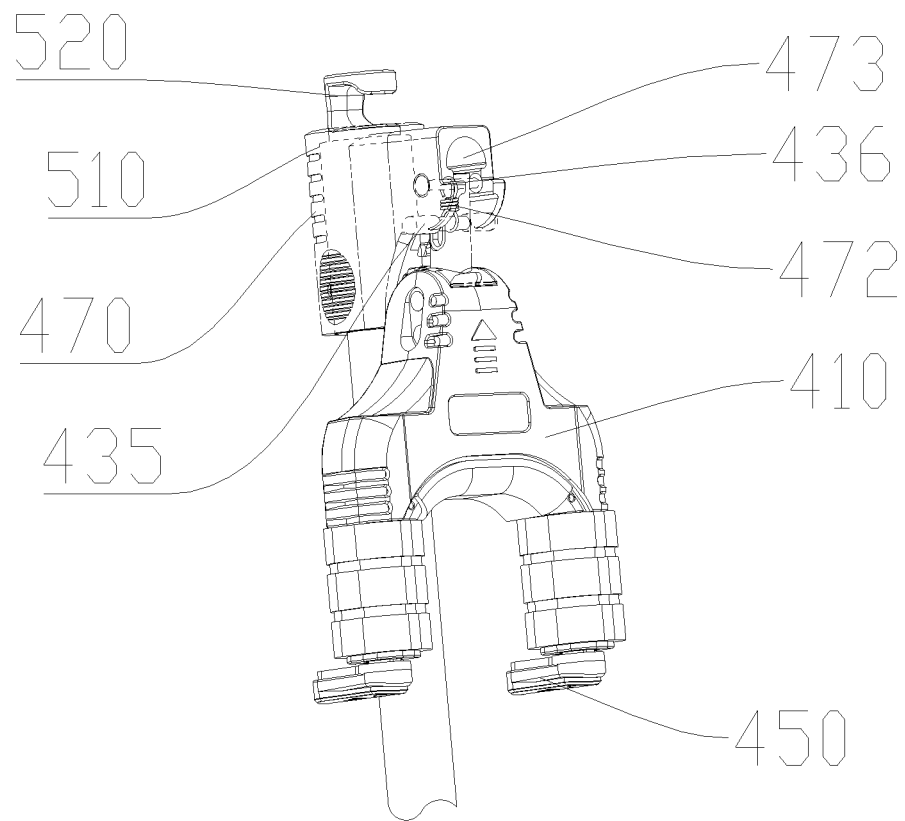
FIG. 6 is a schematic perspective structural diagram of a self-locking hook according to an embodiment of the present invention.
Figure 7:
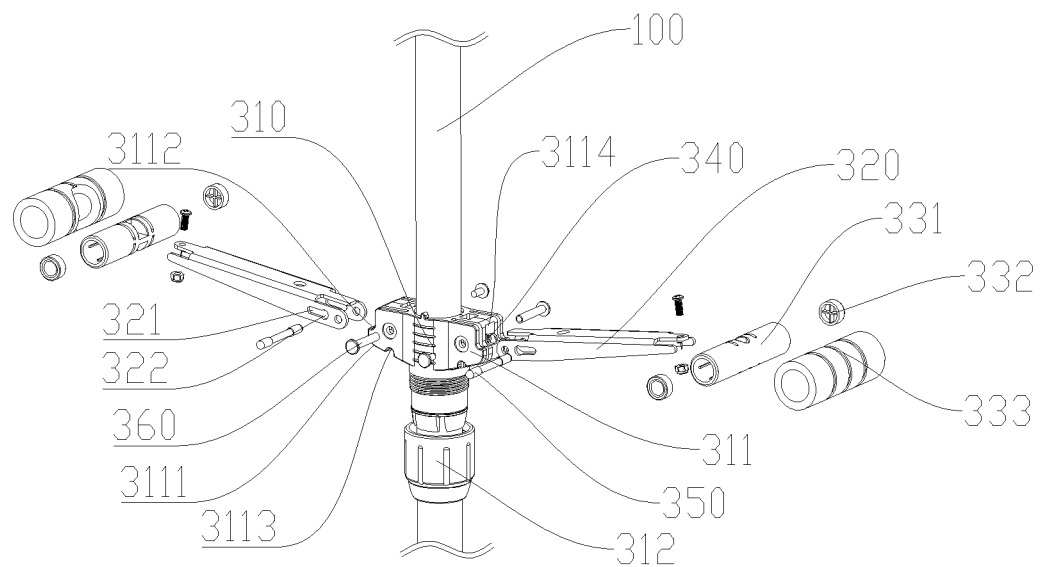
FIG. 7 is a schematic structural diagram of a folding anti-collision component according to an embodiment of the present invention.
Figure 8:
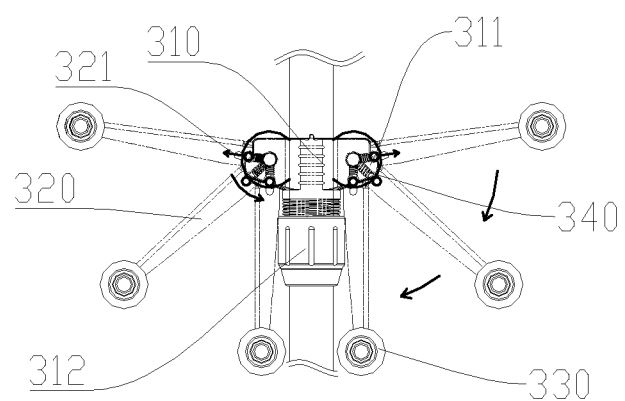
FIG. 8 is a schematic diagram of the folded and unfolded state of a folding anti-collision component according to an embodiment of the present invention.
Figure 9:
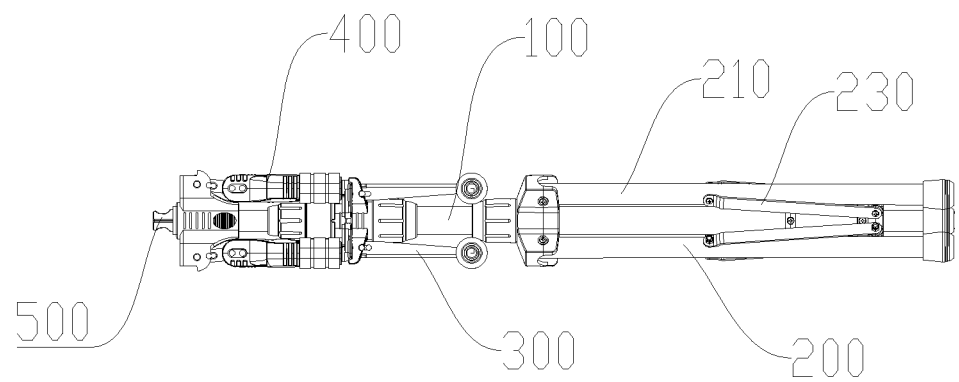
FIG. 9 is a schematic diagram of the retractable and folded state of a vertical floor self-locking musical instrument stand according to an embodiment of the present invention.
Figure 10:
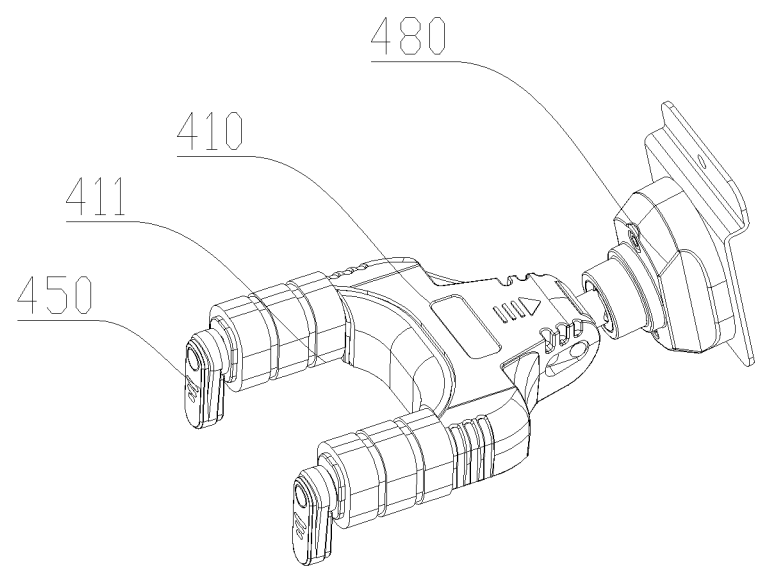
FIG. 10 is a schematic diagram of a self-locking hook according to an embodiment of the present invention.
Figure 11:
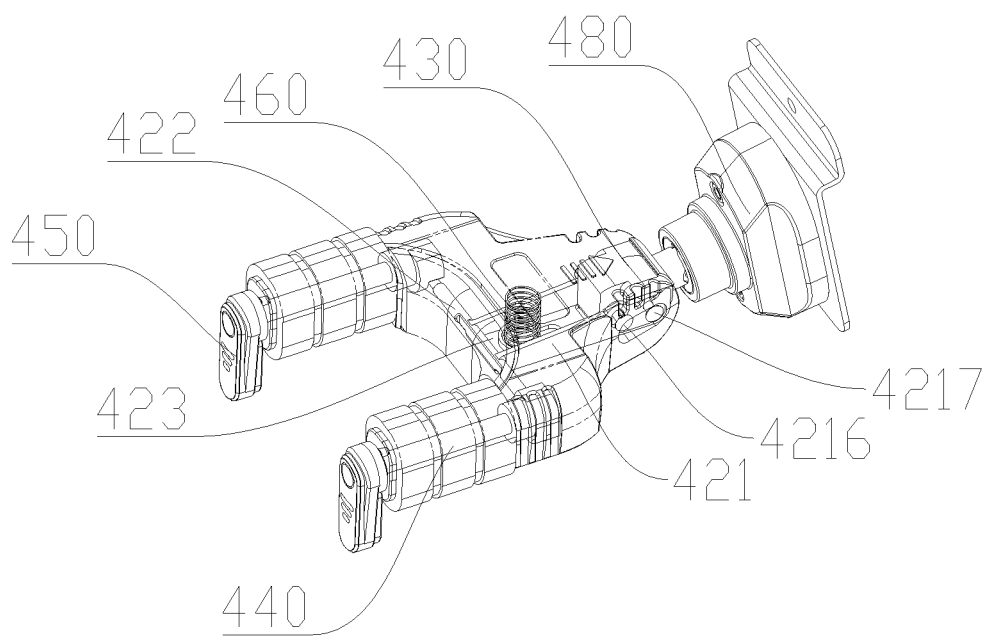
FIG. 11 is a schematic perspective structural diagram of a self-locking hook according to an embodiment of the present invention.

Referring to FIGS. 6, 10 and 11, the hook housing 410 is U-shaped, comprising two arms 412 and a bottom 413 connecting the two arms 412, wherein a rotation shaft 440 is provided in each of the arms 412, each of the rotation shafts 440 is connected with the movable arm 450 which is placed outside the arm 412 of the hook housing 410, and the driving rod 422 drives the two rotation shafts 440 simultaneously so that the two movable locking arms 450 block the opening of the bayonet 411. It is convenient for the U-shape to fix and cooperate with the movable arm 450 to fix the musical instrument. The structure is simple and practical. The two movable locking arms 450 are more stable than a single movable arm 450, which can avoid the string part of the stringed instrument and protect the musical instrument better. Generally, the driving rod 422 and the tail wing 421 are vertically connected.

Referring to FIGS. 11, 13, 15 and 16, a supporting platform 423 supporting the elastic device 460 is provided between the two tail wings 421 at an end away from the connecting rod 430, and a limiting boss adapted to the elastic device 460 is provided on the inner wall surface of the hook housing 410. Generally, the elastic device 460 uses a spring, and a limiting groove 4231 adapted to the spring is provided on the supporting platform 423 and the inner wall of the hook housing 410. In particular, the supporting platform 423 is provided with a position avoiding groove 4232 through which the limiting boss passes.

Figure 13:
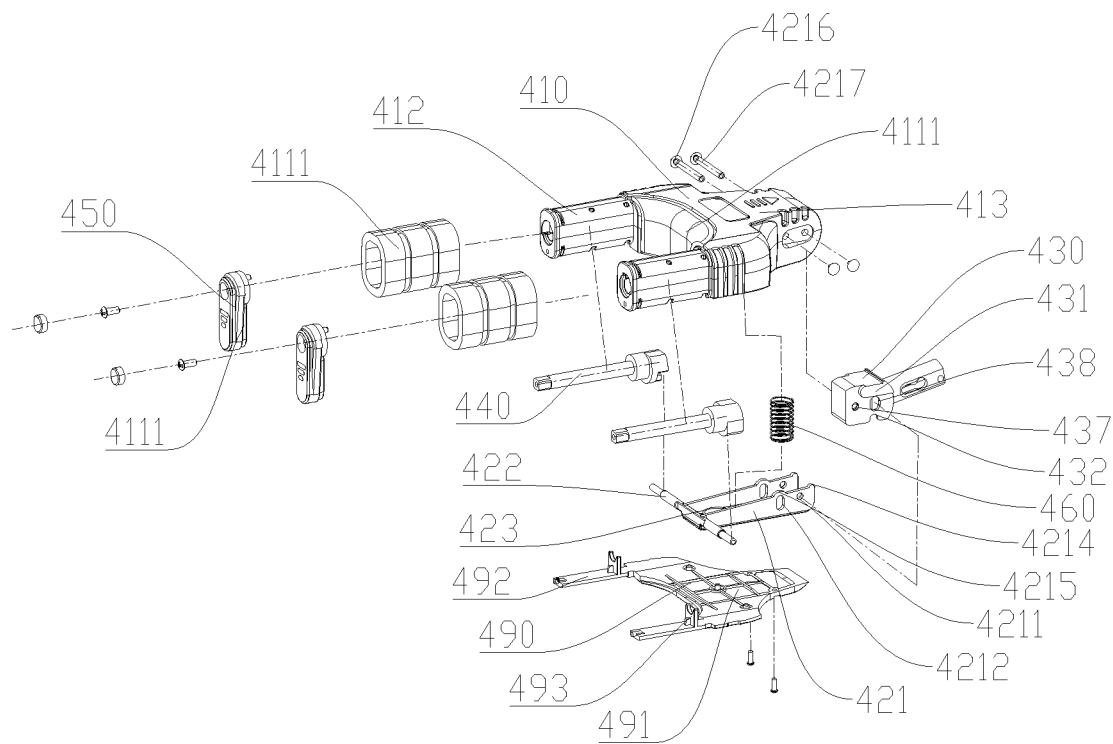
FIG. 13 is an exploded schematic diagram of a self-locking hook according to an embodiment of the present invention.
Figure 15:
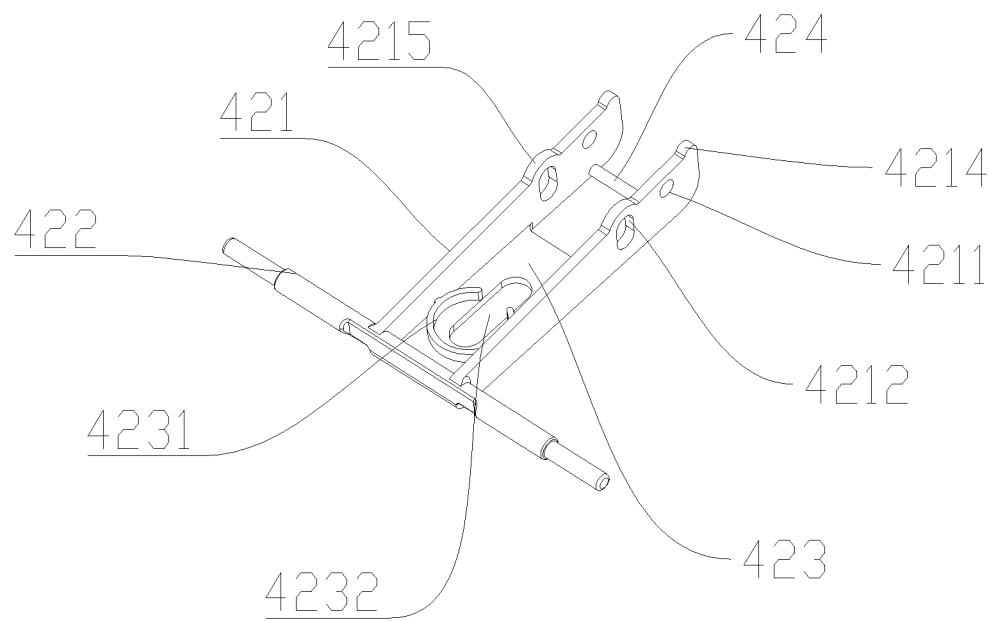
FIG. 15 is a schematic structural diagram of a driving frame according to an embodiment of the present invention.

In particular, one of the tail wing 421 and the connecting rod 430 is adapted to the bolt, and there is a movable gap between the other of the tail wing and the connecting rod and the bolt. Refer to FIGS. 13 and 15, the tail wing 421 is provided with a first waist-shaped hole 4212 and a first through hole 4211 in a direction away from the driving rod 422 in sequence, the connecting rod 430 is provided with a second waist-shaped hole 438 and a second through hole 437, a first bolt 4216 connects the second through hole 437 and the first waist-shaped hole 4212, a second bolt 4217 connects the second waist-shaped hole 438 and the first through hole 4211, there is a movable gap between the first waist-shaped hole 4212 and the first bolt 4216, the first through hole 4211 is adapted to the second bolt 4217, there is a movable gap between the second waist-shaped hole 438 and the second bolt 4217, and the second through hole 437 is adapted to the first bolt 4216. The first waist-shaped hole 4212 can prevent the second bolt 4217 from coining off and improve stability. Alternatively, referring to FIG. 16, the tail wing 421 is provided with a supporting groove 4213 and a first through hole 4211 in a direction away from the driving rod 422 in sequence, the supporting groove 4213 is opened at the end of the elastic device 460 abutted against the hook housing 410, the connecting rod 430 is provided with a second waist-shaped hole 438 and a second through hole 437, the first bolt 4216 connects the supporting groove 4213 and the second through hole 437, the second bolt 4217 connects the first through hole 4211 and the second waist-shaped hole 438, there is a movable gap between the supporting groove 4213 and the first bolt 4216, the first through hole 4211 is adapted to the second bolt 4217, there is a movable gap between the second waist-shaped hole 438 and the second bolt 4217, and the second through hole 437 is adapted to the first bolt 4216. It can be understood that the first through hole 4121, the first waist-shaped hole 4212 or the supporting groove 4213 penetrates the two tail wings 421 along the length of the driving rod 422, and the second through hole 437 and the second waist-shaped hole 438 penetrate the connecting rod 430 along the length of the driving rod 422. Generally, the angle between the hook housing 410 and the telescopic rod 100 after the weight is lowered is generally greater than or equal to 90°. Generally, the first bolt 4216 and the second bolt 4217 are also connected to the hook housing 410, respectively.

Preferably, referring to FIG. 15, the two tail wings 421 are provided in parallel, one end of the two tail wings 421 away from the driving rod 422 is provided with a connecting column 424 connecting the two tail wings 421, and the connecting rod 430 is provided with a movable groove 432 adapted to the connecting column 424. The connecting column 424 can increase the strength of the tail wing 421 and ensure that the two tail wings 421 are parallel to each other.

Figure 16:
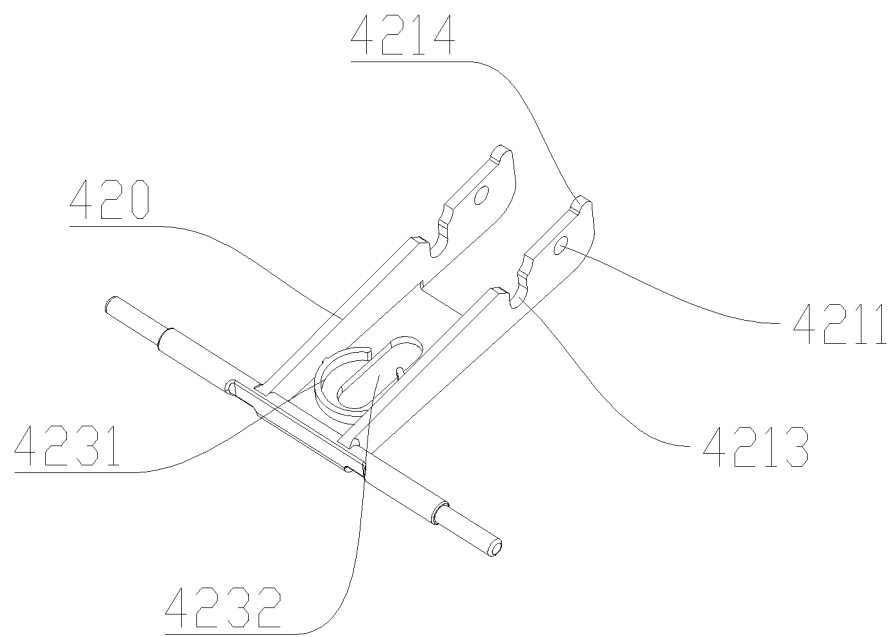
FIG. 16 is a schematic structural diagram of a driving frame according to another embodiment of the present invention.

Referring to FIG. 15 and FIG. 16, one end of the tail wing 421 away from the driving rod 422 is provided with a bump 4214 abutted against the convex strip 431. Generally, the convex point 4214 is arc-shaped, which is convenient for the driving frame 420 to rotate. In particular, referring to FIG. 15, the first waist-shaped hole 4212 is provided with a ring-shaped protective convex plate 4215 facing the convex strip 431. The protective convex plate 4215 is used to be abutted against the convex strip 431 when the suspended object exceeds a certain weight, preventing the tail wing 421 from breaking, and increasing the strength of the tail wing 421.

Figure 5:
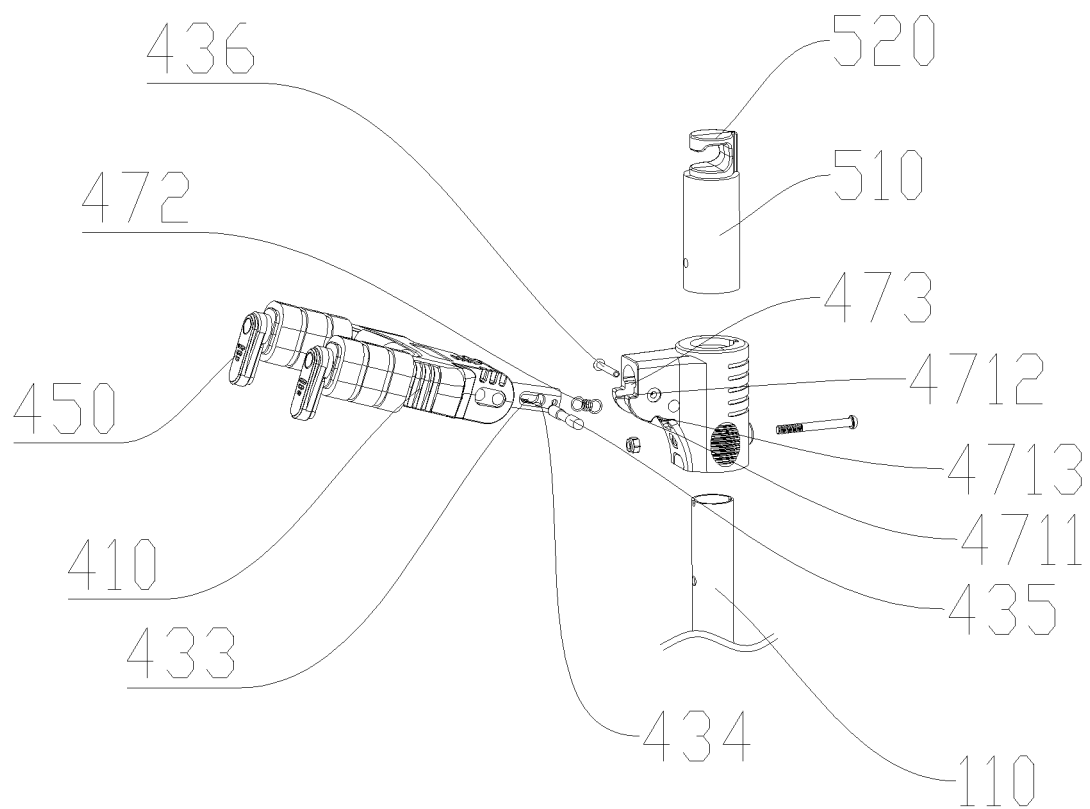
FIG. 5 is a schematic structural diagram of a self-locking hook according to an embodiment of the present invention.

In this embodiment, the self-locking hook 400 is connected to the telescopic rod 100. In other embodiments, the self-locking hook 400 may also be directly fixed on the wall to play a role. Referring to FIGS. 5 and 6, when connected to the telescopic rod 100, the self-locking hook 400 further comprises a connecting base 470. The connecting base 470 is sleeved on the telescopic rod 100 and extends radially outward to form a locking block 471, the locking block 471 comprises an arc-shaped sliding base 4711, an first positioning slot 4712, which is provided at an upper end of the arc-shaped sliding base 4711 and supports the connecting rod 430, and a second positioning slot 4713, which is provided at a lower end of the arc-shaped sliding base 4711 and close to the telescopic rod 100 with a downward-facing opening, and an anti-loosening spring 472 is provided between the connecting base 470 and the connecting rod 430. It is convenient to fold the self-locking hook, facilitate storage and reduce the occupied space. The connecting base 470 can be fixed to the telescopic rod 100 using locking bolts. In particular, the connecting base 470 is sleeved on the end of the telescopic rod 100. A slot 473 which opens obliquely downward in the direction of the connecting rod 430 is provided in the middle of the locking block 471. The connecting rod 430 is in a hollow structure. Sliding grooves 433 are provided on both sides of the connecting rod 430. Sliding pins 435 moving along the sliding grooves 433 are horizontally provided in the sliding grooves 433. The connecting rod 430 is provided with a fixing pin 436 hinged with the locking block 471 at the end of the sliding groove 433 close to the connecting base 470. An anti-loosening spring 472 is provided between the sliding pin 435 and the fixing pin 436. The sliding pin 435 is clamped in the first positioning slot 4712 or the second positioning slot 4713 to maintain the self-locking hook 400 in the unfolded state or the retractable state. In particular, the end of the sliding slot 433 away from the driving frame 420 is provided with an assembly hole 434 communicating with the sliding slot 433 and having a diameter larger than the width of the sliding slot 433. The sliding pin 435 is large at both ends and small in the middle, and is assembled into the sliding slot 433 from the assembly hole 434, preventing the sliding pin 435 from sliding out of the sliding groove 433.

Figure 14:
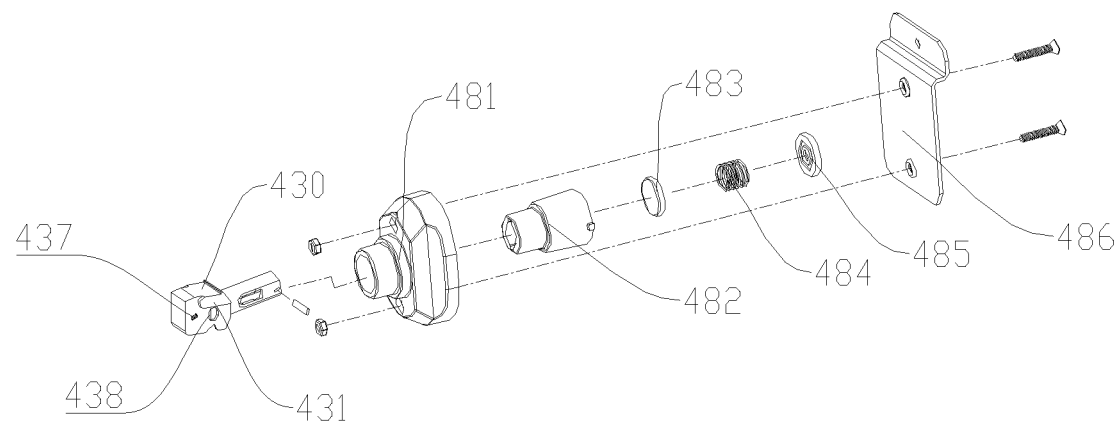
FIG. 14 is an exploded schematic diagram of a base according to an embodiment of the present invention.

Referring to FIGS. 10, 11, and 14, when fixed to a wall or the like, the connecting base 470 can be changed to a base 480. One end of the connecting rod 430 extending out of the U-shaped bottom 413 of the U-shaped hook housing 410 is inserted into the base 480. The specific structure of the base 480 comprises a base fixing member 481, a base connecting member 482, a movable compression spring top sheet 483, a compression spring 484 and a spring fixing bottom sheet 485, and a groove plate buckle 486 can also be provided. The components of the base 480 described above fixes the base fixing member 481, the base connecting member 482, the movable compression spring top sheet 483, the compression spring 484 and the spring fixing bottom sheet 485 to the groove plate buckle 486 by retaining screws of the base 480 in sequence to form the base 480 as a whole. In addition, as an assembly structure, the hook housing 410 shown in FIG.

5 adopts a hollow structure. In plastic molding, the hook housing 410 adopts a semi-open model. The bottom 413 closes the hook housing 410 with a bottom cover 490, and the bottom cover 490 is fixed with fixing screws of the bottom cover 490.

Figure 12:
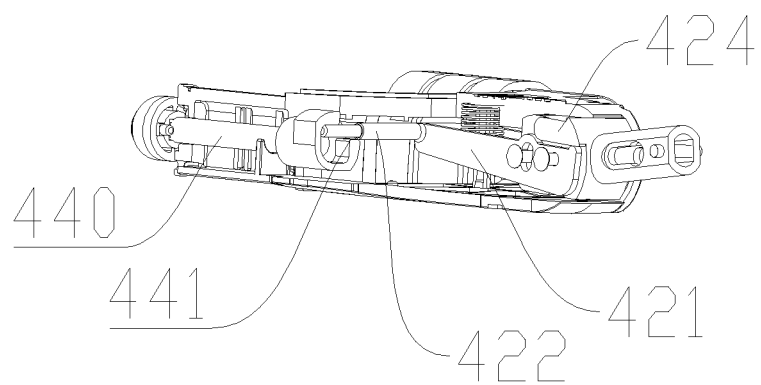
FIG. 12 is a schematic structural diagram of cooperation between a rotation shaft and a driving lever according to an embodiment of the present invention.

Referring to FIGS. 11 to 13, one end of the rotation shaft 440 movably connected to the driving lever is an open slot 441 with a radial opening, and both ends of the driving rod 422 are abutted against the open slot 441 of the two rotation shafts 440, respectively; and when the driving lever drives the two movable rotating shafts 440 to rotate, the driving rod 422 moves up and down in the open slot 441 to drive the two movable rotating shafts 440 to rotate, thereby driving the two movable arm 450 to switch between the open state and the closed state. In particular, the opening angle of the open slot 441 is 90°.

Generally, referring to FIG. 13, a flexible protective sleeve 4111 is also provided on the hook housing 410 and the movable arm 450. The flexible protective sleeve 4111 is provided along the bayonet 411 to buffer the collision between the self-locking hook 400 and the musical instrument to protect the musical instrument.

Generally, the hook housing 410 is formed by buckling the upper part and the lower part, one of which is provided with a cavity, and the other of which is a bottom cover 490 closing the cavity. Referring to FIG. 13, the bottom cover 490 is adapted to the hook housing 410, and comprises a base plate 491 supporting the driving lever and a foot pad 492 extending in the two arms 412 of the hook housing 410 along the base plate 491. The foot pad 492 is provided with a fork frame 493 supporting the movable rotating shaft 440. The bottom cover 490 is provided, which can facilitate the installation of the driving lever and the movable rotating shaft 440 and play a role of supporting and limiting.

When the musical instrument is suspended on the self-locking hook 400, the self-locking hook 400 automatically locks the self-locking locking arm under the gravity of the musical instrument itself, providing protection for the musical instrument suspended thereon. The folding anti-collision component 300 can prevent the musical instrument from collision and provide buffering. The telescopic rod 100 can facilitate telescopic storage, and the telescopic length can be changed as needed; a plurality of folding structures are provided, which can be conveniently unfolded or folded, facilitate storage and reduce the occupied space, or the folding structures can be disassembled as needed. It is convenient and flexible to store and convenient to carry about.

Figure 2:
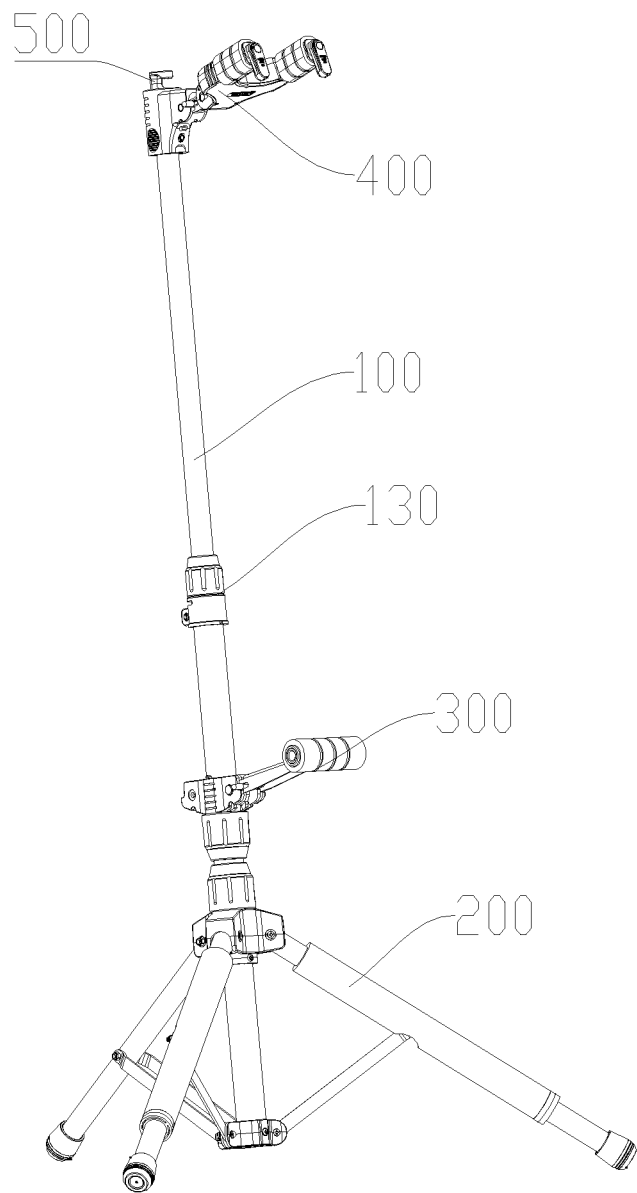
FIG. 2 is a schematic structural diagram of another implementing method of a vertical floor self-locking musical instrument stand according to an embodiment of the present invention.
Figure 3:
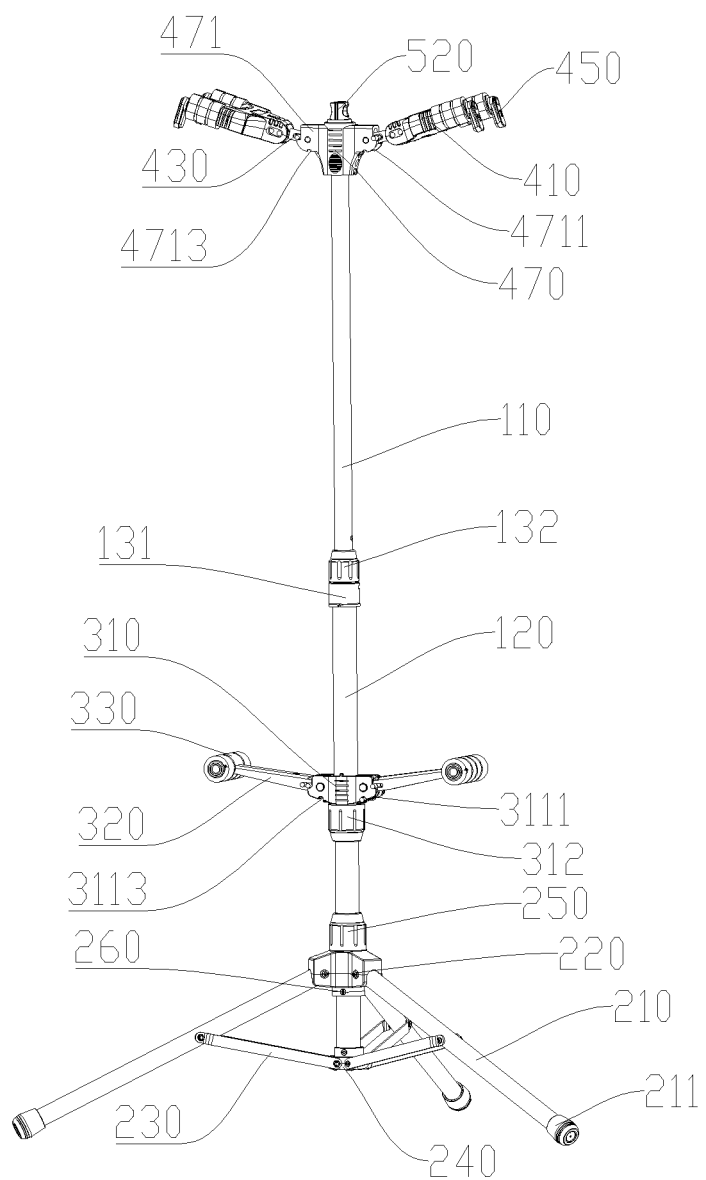
FIG. 3 is a schematic structural diagram of yet another implementing method of a vertical floor self-locking musical instrument stand according to an embodiment of the present invention.
Figure 4:
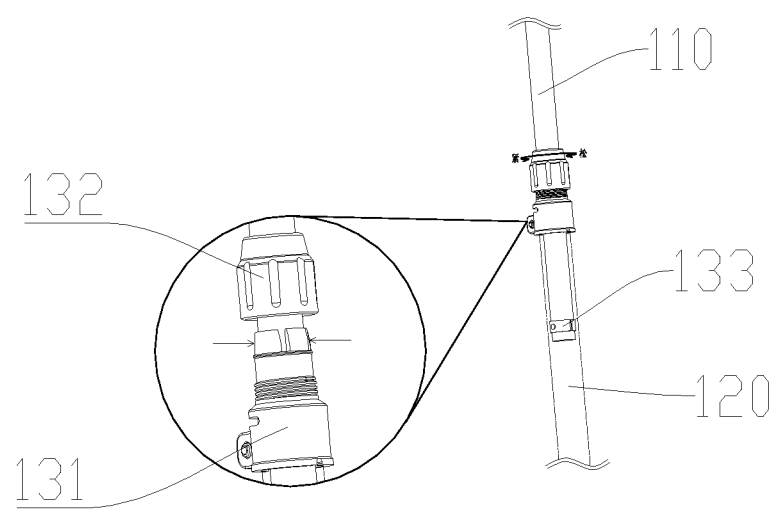
FIG. 4 is a schematic structural diagram of a telescopic rod according to an embodiment of the present invention.

Referring to FIGS. 1 to 3, the folding supporting frame 200 comprises a supporting leg 210, a connecting frame 220, a supporting strip 230 and a collar 240, the folding supporting leg 210 comprises at least three supporting legs 210 hinged with the connecting frame 220, a sleeve hole adapted to the telescopic rod 100 is provided in the middle of the connecting frame 220, the collar 240 is sleeved at the bottom end of the telescopic rod 100, one end of the supporting strip 230 is hinged with the middle section of the supporting leg 210, and the other end thereof is hinged with the collar 240. In particular, one end of the connecting frame 220 is provided with an anti-loosening knob 250 sleeved on the telescopic rod 100, and the other end thereof is provided with a limiting ring 260 fixedly sleeved and connected to the telescopic rod 100. The anti-loosening knob 250 can conveniently adjust the opening angle of the supporting leg 210, and fold the supporting leg 210. The limiting ring 260 can better support the connecting frame 220. In particular, the end of the supporting frame away from the telescopic rod 100 is provided with a soft rubber anti-skid sleeve 211.

Referring to FIGS. 1 to 3 and 7-8, the folding anti-collision component 300 comprises a connecting sleeve 310, a supporting rod 320 and an anti-collision rod 330, the connecting sleeve 310 is sleeved on the telescopic rod 100, the connecting sleeve 310 extends radially outward to form a chuck 311, the chuck 311 comprises an arc-shaped sliding surface 3111, an first positioning bayonet 3112, which is provided at an upper end of the arc-shaped sliding surface 3111 and supports the supporting rod 320, and a second positioning bayonet 3113, which is provided at a lower end of the arc-shaped sliding surface 3111 and close to the telescopic rod 100 with a downward-facing opening, the supporting rod 320 is hinged with the connecting sleeve 310, a tension spring 340 is provided between the supporting rod 320 and the connecting sleeve 310, and the anti-collision rod 330 is connected with the end of the supporting rod 320 away from the connecting sleeve 310. In particular, the anti-collision rod 330 comprises a hollow plastic rod 331, plastic hole plugs 332 connected at both ends of the hollow plastic rod 331, and a cylindrical soft sleeve 333 sleeved outside the hollow plastic rod 331. A perforation is provided in the middle section of the hollow plastic rod 331. The supporting rod 320 passes through the perforation and is fixed to the hollow plastic rod 331 by pins. A flexible member made of a flexible material, that is, a cylindrical soft sleeve 333, wraps around the hollow plastic rod 331 to play a buffering role to avoid contact with the musical instrument to damage the musical instrument. The pin is inside the hollow plastic rod 331, which has beautiful appearance and a compact structure. In particular, the connecting sleeve 310 is provided with a fastening knob 312, and is connected to the telescopic rod 100 through the fastening knob 312, so that the connecting sleeve 310 can move up and down along the telescopic rod 100. A notch 3114 which opens obliquely downward in the direction of the supporting rod 320 is provided in the middle of the chuck 311. The supporting rod 320 is in a hollow structure. Moving grooves 321 are provided on both sides of the supporting rod 320. Sliding pins 350 moving along the moving grooves 321 are horizontally provided in the moving grooves 321. The supporting rod 320 is provided with a rotating pin 360 hinged with the chuck 311 at the end of the supporting rod 320 close to the chuck 311. A tension spring 340 is provided between the moving pin 350 and the rotating pin 360. In particular, the moving pin 350 is large at both ends and small in the middle. The end of the moving grooves 321 close to the chuck 311 is provided with an installing hole 322 having a diameter larger than the width of the moving groove 321. The moving pin 350 is assembled into the mounting hole 322, preventing the moving pin 350 from sliding out of the moving groove 321.

Referring to FIGS. 1-4, the fastener 130 comprises a threaded sleeve 131 sleeved and fixed at the end of the outer rod 120, and an elastic rotating sleeve 132 sleeved on the inner rod 110 and screwed with the threaded sleeve 131. It is convenient to adjust the relative positions of the inner rod 110 and the outer rod 120 of the telescopic rod 100, thereby adjusting the height of the telescopic rod 100. In short, the telescopic rod 100 may be formed by an outer rod 120 and an inner rod 110, or two outer rods 120 connected to an inner rod 110, or two inner rods 110 connected to an outer rod 120, or may be in such a way that a plurality of outer rods 120 and a plurality of inner rods 110 are connected in sequence, which can be set according to specific needs. In particular, the inner rod 110 is provided with a limiting ring 133 in the outer rod 120. The limiting ring 133 is abutted against the threaded sleeve 131 to limit one end of the inner rod 110 to the outer rod 120, preventing the inner rod 110 from being separated from the outer rod 120.

Referring to FIGS. 1 to 3, a simple hook 500 nested with the telescopic rod 100 is provided at the top of the telescopic rod 100. The simple hook 500 comprises a column sleeve 510 and a hook body 520. The column sleeve 510 is nested with the telescopic rod 100. The hook body 520 extends to be exposed. The shape of the hook body 520 can be set as needed. In the present invention, the hook body 520 is formed using an axially opened groove. In particular, the groove is arc-shaped and recessed toward both sides so that the hook body 520 at the top has a blocking effect. The simple hook 500 can be used to suspend backpacks and other objects, and has rich functions.

In particular, three supporting legs 210 are arranged in a triangular shape. The end of the three supporting legs 210 away from the connecting frame 220 is provided with a soft rubber anti-skid sleeve 211. The soft rubber anti-skid sleeve 211 is provided to prevent the stand from sliding on the smooth surface. The lengths of the three supporting legs 210 may be the same, or may be different, and may be set as needed. The present invention provides three reference methods. One of the reference methods is that two of the three supporting legs 210 have the same length, which is shorter than the length of the other supporting leg 210. Another reference method is that two of the three supporting legs 210 have the same length, which is longer than the length of the other supporting leg 210.

In particular, referring to FIGS. 1 to 3, the connecting base 470 can be symmetrically connected with two connecting rods 430 or connected with a plurality of self-locking hooks 400 in an array. That is, one connecting base 470 symmetrically extends with two locking block 471 or extends with a plurality of locking block 471 in an array. Preferably, the connecting base 470 symmetrically extends with two locking block 471; a plurality of connecting bases 470 may be provided along the height, each connecting base 470 deviates from the direction of the locking block 471 at a top or bottom view. Preferably, the locking block 471 radiates outward toward the array. The connecting sleeve 310 can also be symmetrically connected with two folding anti-collision components 300 or connected with a plurality of folding anti-collision components 300 in an array. That is, one connecting sleeve 310 is symmetrically connected with two supporting rods 320 or connected with a plurality of supporting rods 320 in an array. Each supporting rod 320 is connected with an anti-collision rod 330; in particular, at least two folding anti-collision rods 330 are provided along the height, and the circumferential angle of each supporting strip 320 deviates. In particular, each supporting rod 320 forms an array at a top or bottom view; preferably, each connecting sleeve 310 is symmetrically connected with two supporting rods 320 or connected with three supporting rods 320 in an array.

The position and number of the folding anti-collision component 300, the self-locking hook 400 and the simple hook 500 on the telescopic rod 100 may be set as needed. Generally, the simple hook 500 is located at the top of the telescopic rod 100. The self-locking hook 400 is provided close to the top of the telescopic rod 100. The folding anti-collision component is provided in the middle of the telescopic rod 100 or close to the folding supporting frame 200. In particular, the column sleeve 510 of the simple hook 500 is sleeved in the telescopic rod 100, and the hook body 520 is exposed from the top of the telescopic rod 100; two self-locking hooks are provided along the height direction, one of which is provided close to the simple hook 500, and the other of which is located under the fastener 130 of the telescopic rod 100. The two self-locking hooks 400 symmetrically extend with four hook housings 410 with the connecting sleeve 310 as a center. The four hook housings 410 are arranged in an array in the circumferential direction; two anti-collision components 300 are provided along the height, one of which is close to the self-locking hook 400 under the fastener 130, and the other of which is provided close to the folding supporting frame 200.

In summary, the vertical floor self-locking musical instrument stand according to the present invention can facilitate telescopic storage and reduce the occupied space. The telescopic length can be changed as needed to be portable. Various components are flexibly connected and assembled. The height of the position can be adjusted as needed. When the musical instrument is suspended on the self-locking hook according to the present invention, the self-locking hook automatically locks the self-locking locking arm under the gravity of the musical instrument itself, providing protection for the musical instrument suspended thereon.

The above description is only a preferred embodiment of the present invention and is not intended to limit the present invention in any way. Although the present invention has been disclosed in the preferred embodiment as described above, it is not intended to limit the present invention. Any person skilled in the art can make some changes or modifications to equivalent embodiments with equivalent changes by using the above disclosed technical content without departing from the scope of the technical solution of the present invention. However, any simple modifications, equivalent changes and modifications made to the above embodiments according to the technical essence of the present invention without departing from the technical solution of the present invention still fall within the scope of the technical solution of the present invention.

What is claimed is:

1. A vertical floor self-locking musical instrument stand, comprising:
   a telescopic rod, comprising an inner rod and an outer rod nested and connected, and a fastener which fastens the telescopic positions of the inner rod and the outer rod;
   a folding supporting frame, which is connected to the tail end of the telescopic rod and is unfolded or folded in an umbrella-like manner;
   a folding anti-collision component, which is connected to the telescopic rod and is unfolded or folded in an articulated manner, in which a flexible member is provided at an end away from the telescopic rod for anti-collision;
   a self-locking hook, which is connected to the telescopic rod, comprising a hook housing, a driving lever, a rotation shaft, a movable arm and an elastic device, wherein the hook housing forms a bayonet, the hook housing is provided with a cavity, the driving lever comprises a driving frame and a connecting rod, one end of the connecting rod is connected to the telescopic rod away from one end of the driving frame, the driving frame extends into the cavity, the driving frame comprises a driving rod driving the rotation shaft and two tail wings extending away from the driving rod, the connecting rod is nested between the two tail wings and is hinged with the tail wings via a bolt, convex strips are provided at both sides of the connecting rod, the elastic device is configured in the cavity, one end of the elastic device is abutted against one end of the driving frame away from the connecting rod, and the other end of the elastic device is abutted against the inner wall surface of the hook housing, when the hook housing bears load, one end of the tail wing away from the driving rod pushes the convex strip, the driving lever rotates to compress the elastic device, the driving lever drives the rotation shaft to rotate so that the movable arm rotates and is blocks the opening of the bayonet, when the elastic device restores, the elastic device pushes the driving lever, and the driving lever, the rotation shaft and the movable arm swing back, so that the self-locking hook is unfolded.

2. The vertical floor self-locking musical instrument stand according to claim 1, wherein the folding supporting frame comprises a supporting leg, a connecting frame, a supporting strip and a collar, the folding supporting leg comprises at least three supporting legs hinged with the connecting frame, a sleeve hole adapted to the telescopic rod is provided in the middle of the connecting frame, the collar is sleeved at the bottom end of the telescopic rod, one end of the supporting strip is hinged with the middle section of the supporting leg, and the other end thereof is hinged with the collar.

3. The vertical floor self-locking musical instrument stand according to claim 1, wherein the folding anti-collision component comprises a connecting sleeve, a supporting rod and an anti-collision rod, the connecting sleeve is sleeved on the telescopic rod, the connecting sleeve extends radially outward to form a chuck, the chuck comprises an arc-shaped sliding surface, an first positioning bayonet, which is provided at an upper end of the arc-shaped sliding surface and supports the supporting rod, and a second positioning bayonet, which is provided at a lower end of the arc-shaped sliding surface and close to the telescopic rod with a downward-facing opening, the supporting rod is hinged with the connecting sleeve, a tension spring is provided between the supporting rod and the connecting sleeve, and the anti-collision rod is connected with the end of the supporting rod away from the connecting sleeve.

4. The vertical floor self-locking musical instrument stand according to claim 1, wherein the hook housing is U-shaped, comprising two arms and a bottom connecting the two arms, wherein a rotation shaft is provided in each of the arms, each of the rotation shafts is connected with the movable arm which is placed outside the arm of the hook housing, and the driving rod drives the two rotation shafts simultaneously so that the two movable locking arms block the opening of the bayonet.

5. The vertical floor self-locking musical instrument stand according to claim 1, wherein a supporting platform supporting the elastic device is provided between the two tail wings at an end away from the connecting rod, and a limiting boss adapted to the elastic device is provided on the inner wall surface of the hook housing.

6. The vertical floor self-locking musical instrument stand according to claim 5, wherein the tail wing is provided with a first waist-shaped hole and a first through hole in a direction away from the driving rod in sequence, the connecting rod is provided with a second waist-shaped hole and a second through hole, the connecting rod is connected with the second through hole and the first waist-shaped hole by a first bolt, and the connecting rod is connected with the second waist-shaped hole and the first through hole by a second bolt.

7. The vertical floor self-locking musical instrument stand according to claim 6, further comprising a connecting base, wherein the connecting base is sleeved on the telescopic rod and extends radially outward to form a locking block, the locking block comprises an arc-shaped sliding base, an first positioning slot, which is provided at an upper end of the arc-shaped sliding base and supports the connecting rod, and a second positioning slot, which is provided at a lower end of the arc-shaped sliding base and close to the telescopic rod with a downward-facing opening, and an anti-loosening spring is provided between the connecting base and the connecting rod.

8. The vertical floor self-locking musical instrument stand according to claim 1, wherein one end of the tail wing away from the driving rod is provided with a bump abutted against the convex strip.

9. The vertical floor self-locking musical instrument stand according to claim 1, wherein the fastener comprises a threaded sleeve sleeved and fixed on an end of the outer rod and an elastic rotating sleeve sleeved on the inner rod and fastened to the threaded sleeve by screw threads.

10. The vertical floor self-locking musical instrument stand according to claim 1, wherein a simple hook nested with the telescopic rod is provided at the top of the telescopic rod, the simple hook comprises a column sleeve and a hook body, the column sleeve is nested with the telescopic rod, and the hook body extends to be exposed.

11. A self-locking hook, comprising a hook housing, a driving lever, a rotation shaft, a movable arm and an elastic device, wherein the hook housing forms a bayonet, the hook housing is provided with a cavity, one end of the driving lever extends into the cavity and the other end thereof is used for fixed connecting, the driving lever comprises a driving frame and a connecting rod, the driving frame comprises a driving rod driving the rotation shaft and two tail wings extending away from the driving rod, the connecting rod is nested between the two tail wings and is hinged with the tail wings via a bolt, convex strips are provided at both sides of the connecting rod, the elastic device is configured in the cavity, one end of the elastic device is abutted against one end of the driving frame away from the connecting rod, and the other end of the elastic device is abutted against the inner wall surface of the hook housing, when the hook housing bears load, one end of the tail wing away from the driving rod pushes the convex strip, the driving lever rotates to compress the elastic device, the driving lever drives the rotation shaft to rotate so that the movable arm rotates and is blocks the opening of the bayonet, when the elastic device restores, the elastic device pushes the driving lever, and the driving lever, the rotation shaft and the movable arm swing back, so that the self-locking hook is unfolded.

12. The self-locking hook according to claim 11, wherein a supporting platform supporting the elastic device is provided between the two tail wings at an end away from the connecting rod, and a limiting boss adapted to the elastic device is provided on the inner wall surface of the hook housing.

13. The self-locking hook according to claim 11, wherein one of the tail wing and the connecting rod is adapted to the bolt, and there is a movable gap between the other of the tail wing and the connecting rod and the bolt.

14. The self-locking hook according to claim 13, wherein the tail wing is provided with a first waist-shaped hole and a first through hole in a direction away from the driving rod in sequence, the connecting rod is provided with a second waist-shaped hole and a second through hole, a first bolt connects the second through hole and the first waist-shaped hole, a second bolt connects the second waist-shaped hole and the first through hole, there is a movable gap between the first waist-shaped hole and the first bolt, the first through hole is adapted to the second bolt, there is a movable gap between the second waist-shaped hole and the second bolt, and the second through hole is adapted to the first bolt.

15. The self-locking hook according to claim 14, wherein the tail wing is provided with a supporting groove and a first through hole in a direction away from the driving rod in sequence, the supporting groove is opened at the end of the elastic device abutted against the hook housing, the connecting rod is provided with a second waist-shaped hole and a second through hole, the first bolt connects the supporting groove and the second through hole, the second bolt connects the first through hole and the second waist-shaped hole, there is a movable gap between the supporting groove and the first bolt, the first through hole is adapted to the second bolt, there is a movable gap between the second waist-shaped hole and the second bolt, and the second through hole is adapted to the first bolt.

16. The self-locking hook according to claim 11, wherein one end of the tail wing away from the driving rod is provided with a bump abutted against the convex strip.

17. The self-locking hook according to claim 11, wherein two tail wings are provided in parallel, one end of the two tail wings away from the driving rod is provided with a connecting column connecting the two tail wings, and the connecting rod is provided with a movable groove adapted to the connecting column.

18. The self-locking hook according to claim 11, wherein one end of the rotation shaft movably connected to the driving lever is an open slot with a radial opening, and both ends of the driving rod are abutted against the open slot of the two rotation shafts, respectively; and when the driving lever drives the movable rotating shaft to rotate, the driving rod moves up and down in the open slot to drive the movable rotating shaft to rotate, thereby driving the movable arm to switch between the open state and the closed state.

19. The self-locking hook according to claim 11, wherein the hook housing is U-shaped, comprising two arms and a bottom connecting the two arms, wherein a rotation shaft is provided in each of the arms, each of the rotation shafts is connected with the movable arm which is placed outside the arm of the hook housing, and the driving rod drives the two rotation shafts simultaneously so that the two movable locking arms block the opening of the bayonet.

20. The self-locking hook according to claim 11, further comprising a connecting base, wherein the connecting base extends radially outward to form a locking block, the locking block comprises an arc-shaped sliding base, an first positioning slot, which is provided at an upper end of the arc-shaped sliding base and supports the connecting rod, and a second positioning slot, which is provided at a lower end of the arc-shaped sliding base with a downward-facing opening, and an anti-loosening spring is provided between the connecting base and the connecting rod.

* * * * *